United States Patent [19]
Benson et al.

[11] Patent Number: 5,429,645
[45] Date of Patent: Jul. 4, 1995

[54] SOLID FUEL AND PROCESS FOR COMBUSTION OF THE SOLID FUEL

[76] Inventors: Peter H. Benson, 12115 87th Ave., Palos Park, Ill. 60464; William S. Wickersham, 150 E. Northwest Hwy., Ste. H, Des Plaines, Ill. 60016-2259

[21] Appl. No.: 1,110

[22] Filed: Jan. 5, 1993

Related U.S. Application Data

[63] Continuation-in-part of Ser. No. 622,944, Dec. 6, 1990, abandoned.

[51] Int. Cl.$^6$ .................... C10L 5/42; C10L 5/44; C10L 5/46; C10L 5/48
[52] U.S. Cl. .................... 44/589; 44/590; 44/592; 44/593; 44/596
[58] Field of Search ................ 44/589, 590, 592, 593, 44/596

[56] References Cited

U.S. PATENT DOCUMENTS

| | | | |
|---|---|---|---|
| 1,015,302 | 1/1912 | Dickson | 44/589 |
| 4,043,764 | 8/1977 | Loas | 44/590 |
| 4,152,119 | 5/1979 | Schulz | 44/589 |
| 4,230,460 | 10/1980 | Maust, Jr. | 44/589 |
| 4,372,749 | 2/1983 | Nielsen | 44/589 |
| 4,398,917 | 8/1983 | Reilly | 44/593 |
| 4,405,331 | 9/1983 | Blaustein et al. | 44/589 |
| 4,503,785 | 3/1985 | Scocca | 44/589 |
| 4,517,165 | 5/1985 | Moriarty | 423/244.05 |
| 4,561,860 | 12/1985 | Gulley et al. | 44/589 |
| 4,616,574 | 10/1986 | Abrams et al. | 44/640 |
| 4,758,244 | 7/1988 | Harvey et al. | 44/592 |
| 5,009,672 | 4/1991 | Ruffo et al. | 44/595 |

FOREIGN PATENT DOCUMENTS

| 36140 | 9/1981 | European Pat. Off. | 44/589 |
|---|---|---|---|

OTHER PUBLICATIONS

The Condensed Chemical Dictionary, p. 453, tenth edition (date unknown).
Biomass Research Program Update, a Tennesee Valley Authority publication, vol. 3, No. 1, Oct. 1990.
Production of Ethanol and Coproducts From MSW-Derived Cellulosics Using Dilute Sulfuric Acid Hydrolysis, Barrier et al., presented at Twelfth Symposium on Biotechnology for Fuels and Chemicals, Gatlinburg, Tenn., May 7–11, 1990.
New Process Turns Refuse Into a Usable Fuel: Binder—Enhanced Refuse-Derived Fuel (b-dRDF) Pellets, Argonne National Laboratory. (date unknown).
Letter from Argonne National Laboratory to Mr. Vern Lundell at Lundell Equipment Manufacturing Company, dated Jan. 27, 1989.
Argonne National Laboratory's 1989 R&D 100 Entry Form, Description Of Product (date unknown).
The Condensed Chemical Dictionary, p. 453, Tenth Edition. (date unknown).
Letter from Argonne National Laboratory to Mr. Vernon Lundell of Lundell Manufacturing Company, Inc., dated Mar. 39 (incorrect date as shown on the letter) 1989.

*Primary Examiner*—Jerry D. Johnson
*Attorney, Agent, or Firm*—Speckman, Pauley & Fejer

[57] ABSTRACT

A solid fuel containing a recycled residue from anaerobic fermentation or anaerobic digestion of an organic material. The solid fuel can also contain a volatile solid fossil fuel. The residue is preferably derived from an anaerobic digestion process of municipal solid waste, raw sewage sludge, biomass feedstock, industrial waste, agricultural waste or mixtures thereof. The volatile solid fossil fuel preferably contains a coal constituent of lignite, anthracite coal, meta-anthracite coal, bituminous coal and/or sub-bituminous coal. Regardless of whether the solid fuel contains only recycled residue or recycled residue bound with a volatile solid fossil fuel, the solid fuel can be formed into pellets or energy cubes.

10 Claims, 7 Drawing Sheets

| ENERGY VALUE INDEX ||
|---|---|
| FUEL | Btu/lb |
| MIXED MSW | 5,000 – 5,200 |
| REFUSE-DERIVED FUEL | 5,700 – 6,200 |
| FOOD | 1,800 – 7,800 |
| PAPER | 7,200 – 8,000 |
| PLASTICS | 9,500 – 18,000 |
| RUBBER | 12,000 – 14,000 |
| TEXTILES | 8,000 – 8,800 |
| WOOD | 4,700 – 7,000 |
| YARD WASTE | 4,200 – 7,000 |
| LIGNITE COAL | 6,900 |
| BITUMINOUS COAL | 9,000 – 14,500 |
| #6 FUEL OIL | 17,410 – 18,990 |
| #2 HOME HEATING OIL | 19,170 – 19,750 |
| NATURAL GAS | 21,800 |

FIG.5

| COMMON NAME | ASTM CLASS | DEFINITION |
|---|---|---|
| MSW | RDF-1 | MSW USED AS FUEL IN AS-DISCARDED FORM |
| COARSE RDF | RDF-2 | MSW PROCESSED TO A COARSE PARTICLE SIZE WITH OR WITHOUT FERROUS METAL SEPARATION |
| FINE RDF | RDF-3 | MSW PROCESSED TO A PARTICLE SIZE SUCH THAT 95 PERCENT BY WEIGHT PASSES THROUGH A 2 INCH (50 mm) SQUARE MESH SCREEN AND FROM WHICH MOST METALS, GLASS, AND OTHER INORGANICS HAVE BEEN REMOVED. |
| POWDERED RDF | RDF-4 | MSW PROCESSED INTO A POWDERED FORM SUCH THAT 95 PERCENT BY WEIGHT PASSES THROUGH A 10-MESH WIRE SCREEN AND FROM WHICH MOST METALS, GLASS, AND OTHER INORGANIC MATERIALS HAVE BEEN REMOVED. |
| DENSIFIED RDF (dRDF) | RDF-5 | MSW THAT HAS BEEN PROCESSED AND DENSIFIED (COMPRESSED) INTO THE FORM OF PELLETS, SLUGS, CUBETTES, OR BRIQUETTES. |
|  | RDF-6 | MSW THAT HAS BEEN PROCESSED INTO A LIQUID FUEL. |
|  | RDF-7 | MSW THAT HAS BEEN PROCESSED INTO A GASEOUS FUEL. |

FIG.6

| RDF PRODUCT CHARACTERISTICS | | | | | |
|---|---|---|---|---|---|
| | MSW (RDF-1) | COARSE (RDF-2) | FINE (RDF-3) | POWDER (RDF-4) | DENSIFIED (RDF-5) |
| HHV (BTU/lb) | 4,500 | 4,700–5,500 | 5,600–6,000 | 6,500–7,500 | 7,500–8,000 |
| MOISTURE (%) | 30 | 15–25 | 12–20 | 1–5 | 5–7 |
| ASH (%) | 36 | 12–20 | 15–20 | 10–20 | 10–14 |
| BULK DENSITY (lb/ft³) | 12 | 3–7 | 2–6 | 20–35 | 28–48 |
| PERCENT YIELD | --- | 70–80 | 55–65 | 45–55 | 45–55 |

FIG.7

| HEATING VALUES RDF vs DIGESTER RESIDUE | | |
|---|---|---|
| | RDF | DIGESTATE |
| CARBON | 38.48 | 49.13 |
| HYDROGEN | 5.12 | 6.99 |
| OXYGEN | 32.25 | 25.28 |
| NITROGEN | 0.74 | 0.76 |
| SULFUR | 0.17 | 0.23 |
| CHLORINE | 0.47 | 0.83 |
| INERTS | 22.77 | 16.80 |
| TOTAL | 100.00 | 100.00 |
| HEATING VALUE (BTU/lb–DRY) | 6490 | 9410 |

FIG. 8

SOLID FUEL AND PROCESS FOR COMBUSTION OF THE SOLID FUEL

CROSS REFERENCE TO RELATED APPLICATION

This is a continuation-in-part patent application of patent application having Ser. No. 07/622,944, filed Dec. 6, 1990, now abandoned.

BACKGROUND OF THE INVENTION

1. Field of the Invention

This invention relates to a solid fuel which at least partially includes a recycled residue from anaerobic fermentation of an organic material.

2. Description of Prior Art

Municipal Solid Waste (MSW) can be processed into a Refuse Derived Fuel (RDF). The RDF can be used either alone or with coal as a solid fuel. The RDF and coal combination solid fuel has been co-fired with or densified into pellets. However, such RDF and coal combination solid fuel does not have a very high heat content, relative to coal alone, and has high ash content. For example, most RDF has a heat content of 5,000 to 8,000 Btu/lb dry matter and requires a non-voltage binder when densified, or compressed, into a solid fuel.

When burned, such REF and coal combination solid fuels produce combustion products with a high content of sulfur oxides ($SO_x$), particularly sulfur dioxide ($SO_2$), nitrogen oxides ($NO_x$), total hydrocarbons (THC) and ash. As the heat content of the RDF and coal combination solid fuel increases, the cost of further processing and densifying the RDF and coal combination also increases. With pure coal or a combination solid fuel of coal and RDF as a fuel, power plants typically will operate with relatively high $SO_2$, $NO_x$ and THC emissions, with respect to Environmental Protection Agency (EPA) standards, and if such fuels are burned, then many existing power plants require costly retrofits or equipment modifications in order to meet EPA standards. Particularly in the Midwestern United States, such emissions are extremely high due to the high-sulfur content coal readily available to and often used within such power plants. Under current EPA standards, power plants are required to operate with Best Available Control Technology (BACT) which includes stack emissions control devices, such as scrubbers and bag houses.

There exists a need for a solid fuel and process for combustion of a solid fuel wherein undesirable emissions such as $SO_2$, $NO_x$ and THC are reduced to meet EPA emissions standards without the need for additional and expensive equipment modifications, heat content values are increased and costs, particularly those costs associated with burning coal, are reduced.

SUMMARY OF THE INVENTION

It is one object of this invention to provide a solid fuel with a high heat content value which when combusted produces low levels of undesirable emissions.

It is another object of this invention to provide a solid fuel which acts as a binder either alone or when combined with volatile solid fossil fuels.

It is yet another object of this invention to provide a solid fuel which can be combined with a volatile solid fossil fuel for reducing the undesirable emissions of combustion of the solid fuel, increasing the overall heat content value of the fuel and reducing the overall cost of the fuel.

The above objects of this invention are achieved with a solid fuel which contains a recycled residue from anaerobic fermentation, also known as anaerobic digestion, of organic material. In one preferred embodiment according to this invention, the organic material is either municipal solid waste (MSW), raw sewage sludge, biomass feedstock, industrial waste, agricultural waste or any combination or mixture thereof. The residue has a heat content within a range from approximately 8,500 to 10,500 Btu/lb dry matter, typically approximately 9,500 Btu/lb dry matter. In one preferred embodiment according to this invention, the residue is compressed into a pellet form for handling purposes.

In another preferred embodiment according to this invention, the solid fuel contains the recycled residue from the anaerobic digestion of the organic material, as well as a volatile solid fossil fuel. The solid fossil fuel of this invention preferably contains a coal constituent of lignite, anthracite coal, meta-anthracite coal, bituminous coal and/or sub-bituminous coal. The solid fossil fuel may contain other fossil fuels known in the art.

Conventional processes for combustion of a combustible mixture within a combustion chamber include introducing a solid fuel and combustion air, either individually or pre-mixed, into the combustion chamber. Combustion products are discharged from the combustion chamber. According to one preferred embodiment of this invention, an improvement to such conventional combustion processes includes mixing the combustion air with the recycled residue from the anaerobic fermentation of the organic material to form the combustible mixture. The combustible mixture is then ignited. The downstream combustion products in a process according to this invention contain reduced $SO_2$, $NO_x$ and THC, even without Best Available Control Technology (BACT), as compared to combustion processes using conventional solid fuels which require BACT.

DESCRIPTION OF PREFERRED EMBODIMENTS

Figure 1:
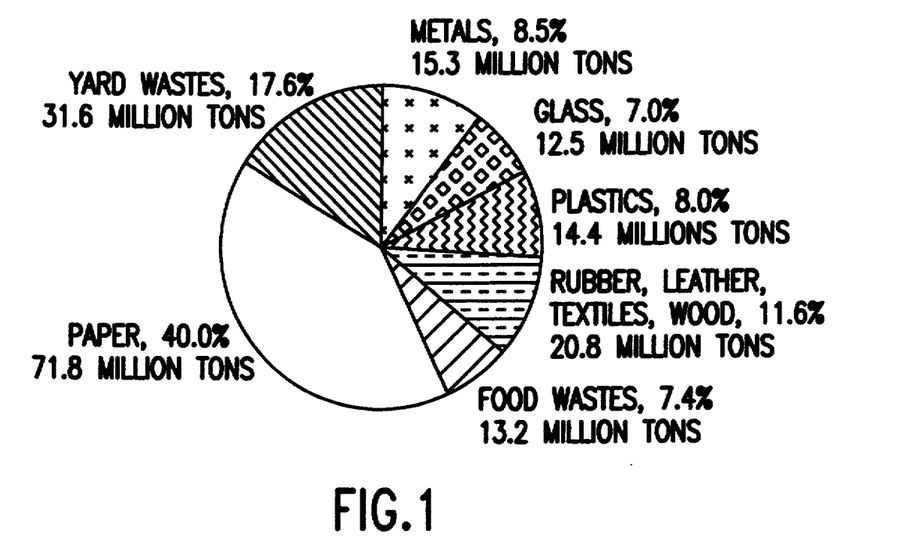
FIG. 1 is a table showing MSW materials by weight, generated in 1988, which is published in *SOLID WASTE MANAGEMENT Newsletter*, Office of Technology Transfer of the University of Illinois, Vol. 4, No. 10, October 1990.

Municipal solid waste (MSW), as defined by the USEPA (EPA 1990) and as shown in FIG. 1, is composed of 40% paper; 17.6% yardwaste; 7.4% foodwaste; 11.6% rubber, leather, textiles and wood; 8.5% metals, 8% plastics and 7% glass. At least 80% of this mixture is organically derived and combustible while the other inorganic fraction, such as metals, glass, grit, etc. is inert or noncombustible.

Although it has a low average heating value (4000–5000 Btu/lb) and creates toxic air emissions and ash disposal problems, MSW can be burned as received in a waste-to-energy (WTE) facility to produce energy for process heat or conversion to power. The power generation capability of a WTE facility is generally based upon the overall heating value of the MSW burned.

Figure 5:
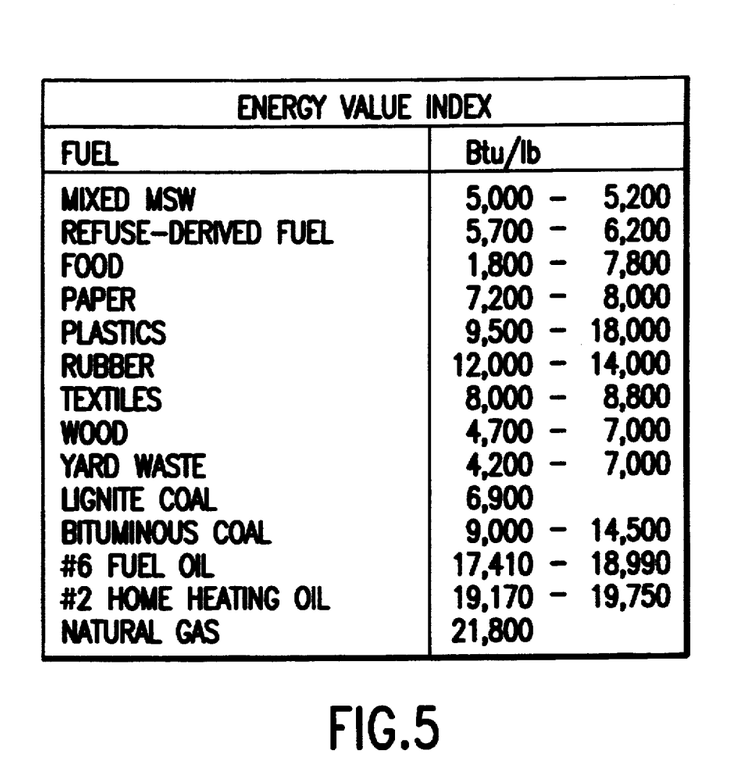
FIG. 5 is a table showing energy value indexes for various fuels.

The average energy value of MSW and some of its components are compared to other primary energy sources in FIG. 5. The organically derived components of MSW: paper, plastics, etc. have high heating values, 7200 to 8000 and 9500 to 18,000 Btu/lb, respectively vs. 6900 Btu/lb for lignite coal. By processing the MSW to remove and recycle inerts and enhance or increase the organic component to form a Refuse Derived Fuel (RDF), the heating value of the resultant material can be greatly increased.

Figure 6:
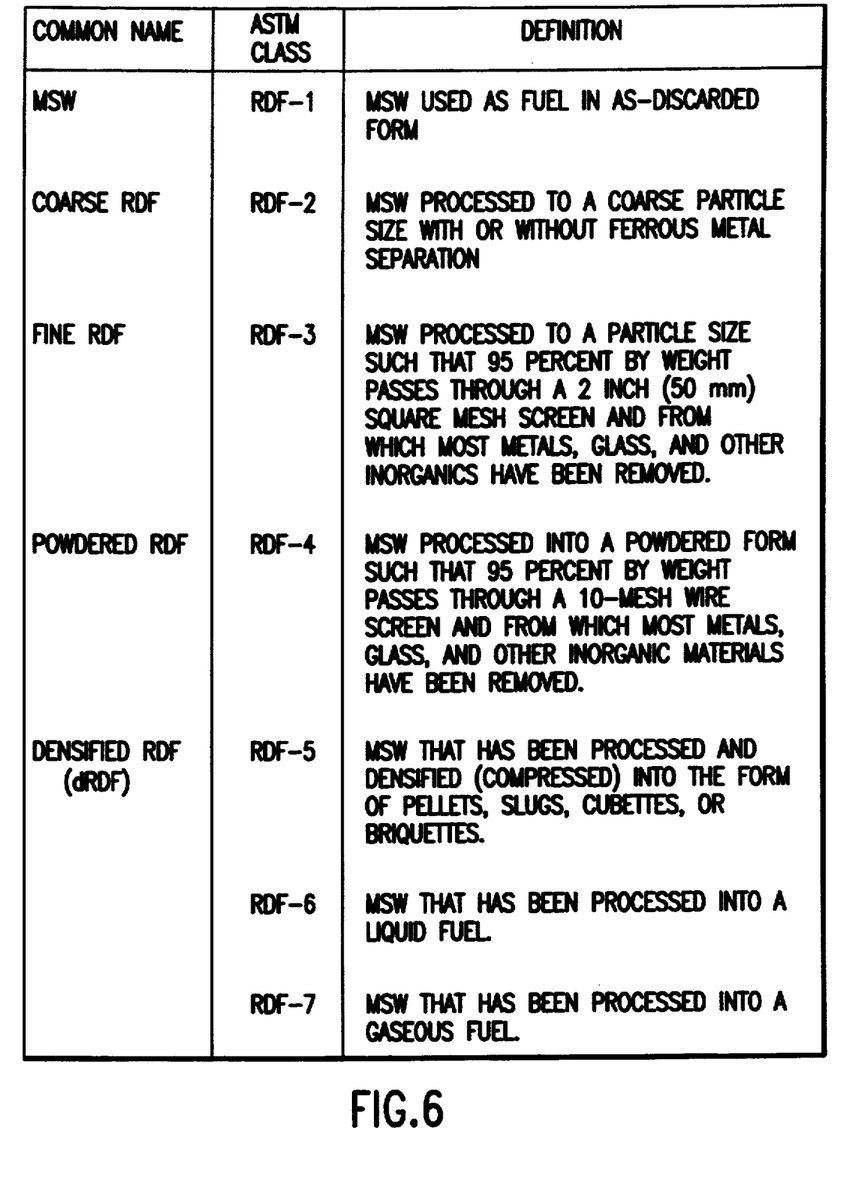
FIG. 6 is a table showing Refuse Derived Fuel classifications and their corresponding definitions.
Figure 7:
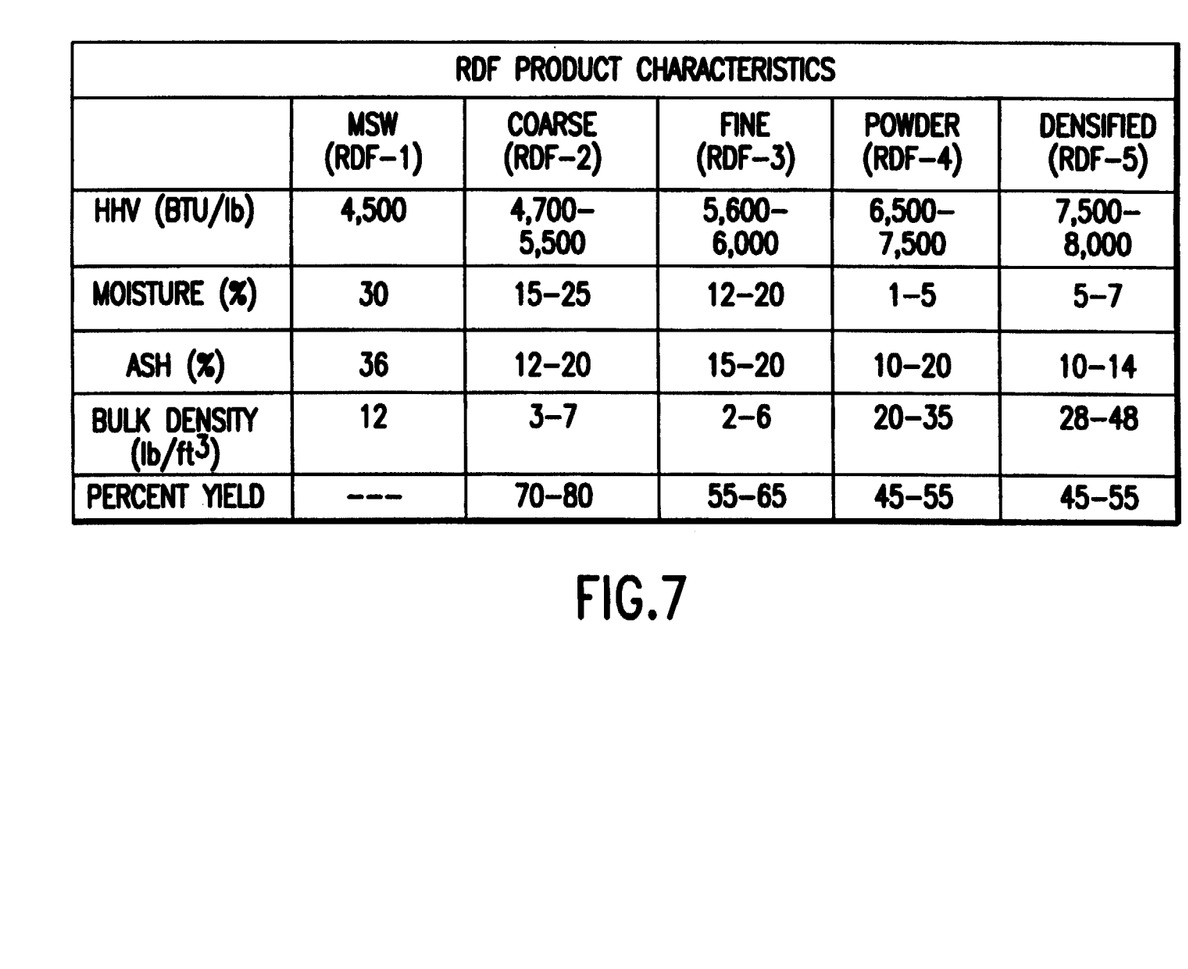
FIG. 7 is a table showing RDF product characteristics.

Based upon the degree of processing and the resultant heating value, ASTM recognizes five classes of RDF, RDF-1 being MSW as received, as shown in FIGS. 6 and 7. Fine RDF (RDF-3) with most of the inerts removed and size reduction, has a heating value of 5600–6000 Btu/lb. Densified RDF (dRDF or RDF-5) which is essentially RDF-3 which has been compressed or densified into pellets, slugs, cubettes or briquettes has a heating value of 7500–8000 Btu/lb.

The more that MSW is preprocessed and densified, the more homogenous and substantial is the solid fuel produced and the better is its combustion characteristics. RDF-5 is further enhanced by the addition of binders which form a harder, denser solid fuel which is required for effective storage and transportation and improves air emissions although it decreases overall heating value.

There are numerous papers, reports and patents which describe the processing of MSW into a solid fuel or RDF. There are also references to combining it with coal and other combustibles to increase heat value (European Patent No. 0 036 140, Ruffo et al., U.S. Pat. No. 5,009,672). But none consider improving the solid fuel by selecting for a high energy residue end product from the anaerobic digestion of the major components of MSW: paper, paper products and yardwaste the lignocellulosic component of MSW, as taught in this specification.

Although MSW is typically 20–30% moisture, to "separate the putrescible organic material from the dry material" with "high-pressure compression" as taught by the process of Ruffo et al., U.S. Pat. No. 5,009,672, would only produce compacted RDF-1 or Coarse RDF-2. No moisture, "paste-like mass" or "pulp" is extruded or remains as a residue after compression of MSW and the resultant mix of materials, the ". . . dry part, constituted by paper, plastics, fabric, glass, nonferrous metals and other fine constituents which are expelled in the form of compacted blocks . . ." as taught at Col. 4, lines 1–3 of the Ruffo et al. '672 patent, results in low energy compressed MSW or Coarse RDF not ". . . a solid fuel with a high heating value which is free from pollutants . . ." and can be ". . . stored . . ." as taught at Col. 3, lines 29–31 of the Ruffo et al. '672 patent. Densified RDF requires a binder to maintain integrity for handling and storage purposes.

Recovery of recyclable materials cannot be accomplished as taught by the Ruffo et al. '672 patent, since they are all now thoroughly contaminated and impossible to effectively separate after being compressed together. Resource recovery is limited since paper, the major component of the "block" is burned and not converted to other energy products to maximize resource recovery. The Ruffo et al. '672 patent teaches a very impractical way to treat MSW for any environmentally acceptable, cost-effective resource recovery operation.

Fortunately, MSW does have a relatively high moisture content and, being primarily organic, is biodegradable and therefore amendable to the anaerobic digestion process. According to our invention, the anaerobic digestion of an RDF-3 type feed, the ligno-cellulosic paper and yardwaste component, results in a high energy, lignin enriched residue which can be compressed without binder into a dense, homogenous, relatively clean burning solid fuel with or without the addition of coal and/or other combustible materials. Such high energy, lignin enriched residue preferably has a heat content value of approximately 8,500 to 10,500 Btu/lb dry matter.

Figure 2:
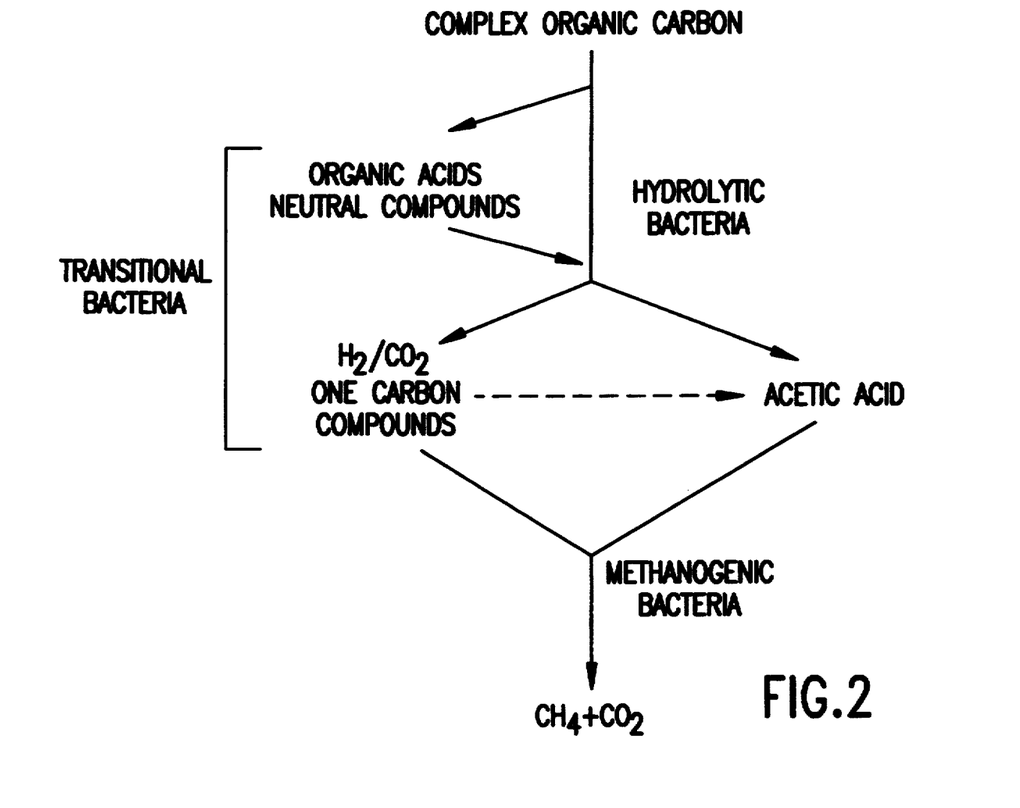
FIG. 2 is a basic illustration showing anaerobic digestion of organic feeds.

The anaerobic digestion (AD) process according to this invention, as shown in FIG. 2, is mediated by a consortium of bacterial populations which break down complex organic compounds into simpler organic molecules in an aqueous, neutral pH medium and the absence of oxygen. Hydrolytic bacteria (Acidogens) break down complex organic compounds, like cellulose or starch, into simpler carbon compounds which are then transformed into fatty acids, primarily acetic acid, by bacteria called Acetogens.

Fatty acids are further broken down, in the absence of oxygen, into methane and carbon dioxide by a group of bacteria called the Methanogens. It is important to note that this is not an alcohol fermentation. It requires an oxygen-free moist environment. Activity begins to cease at moisture levels below 75%, not a "dry environment" as taught by the Ruffo et al. '672 patent, at Col. 4, line 17.

The production of methane, a clean burning, high value primary energy source, maximizes resource recovery from MSW. This recovery is further enhanced by utilizing the digester residue from the anaerobic digestion process as a recycled, high energy solid fuel as proposed in this specification.

As determined by the U.S. Public Health Service, Public Health Service Report No. 1-D01-UI-006-01, "The Feasibility of Baling Municipal Refuse", the chemical composition of baled MSW is approximately 60% Cellulose/Hemicellulose, 8% lignin, 13% carbohydrate, 8% metals, 9% inert polymers and glass, and 2% miscellaneous. The preprocessing of this mixture to remove inerts further increases the proportion of ligno-cellulosic content, such as cellulose, hemicellulose and lignin derived from the predominant paper and yardwaste components of MSW, in the resultant RDF feed to the digester.

Workers at the University of California, Berkeley determined that newsprint, a major component of the paper fraction of MSW, is composed of 5% moisture, 68% Alpha-cellulose, 15% Hemicellulose, 20% Lignin and 2% other. When this ligno-cellulosic feed is subjected to the anaerobic digestion process, the highly oxygenated carbon compounds (celluloses) are rapidly converted into methane and carbon dioxide, while the less oxygenated, recalcitrant lignin compounds remain in the digester as a residue.

Figure 8:
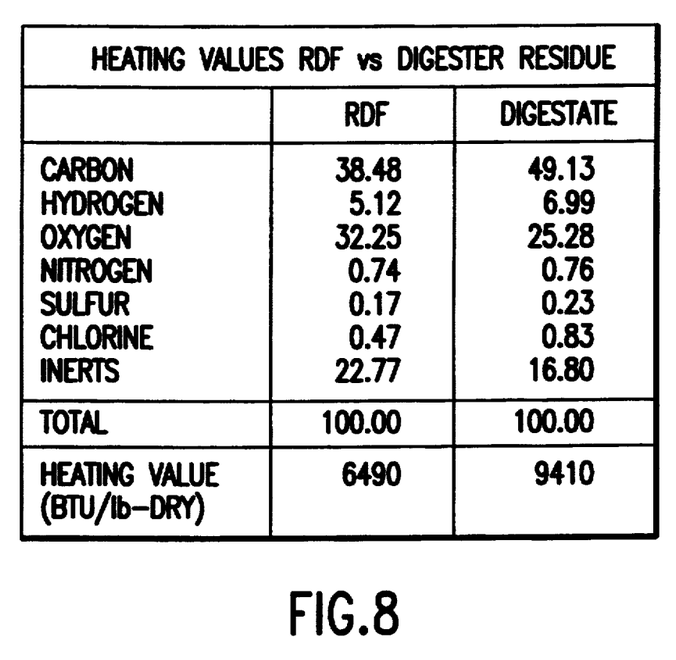
FIG. 8 is a table showing partial and total heating values for RDF and digester residue.

These compounds and the bits and pieces of plastic, textile and rubber that cannot be completely removed from the RDF prior to AD, account for the much higher heating value of the digester residue (digestate) as illustrated in FIG. 8. Processed RDF feed into the digester has an average heating value of 6490 Btu/lb vs. 9410 Btu/lb for the resultant digester residue after AD. This lignin enriched residue, derived primarily from paper in the digester feed, is crucial to our invention.

Figure 3:
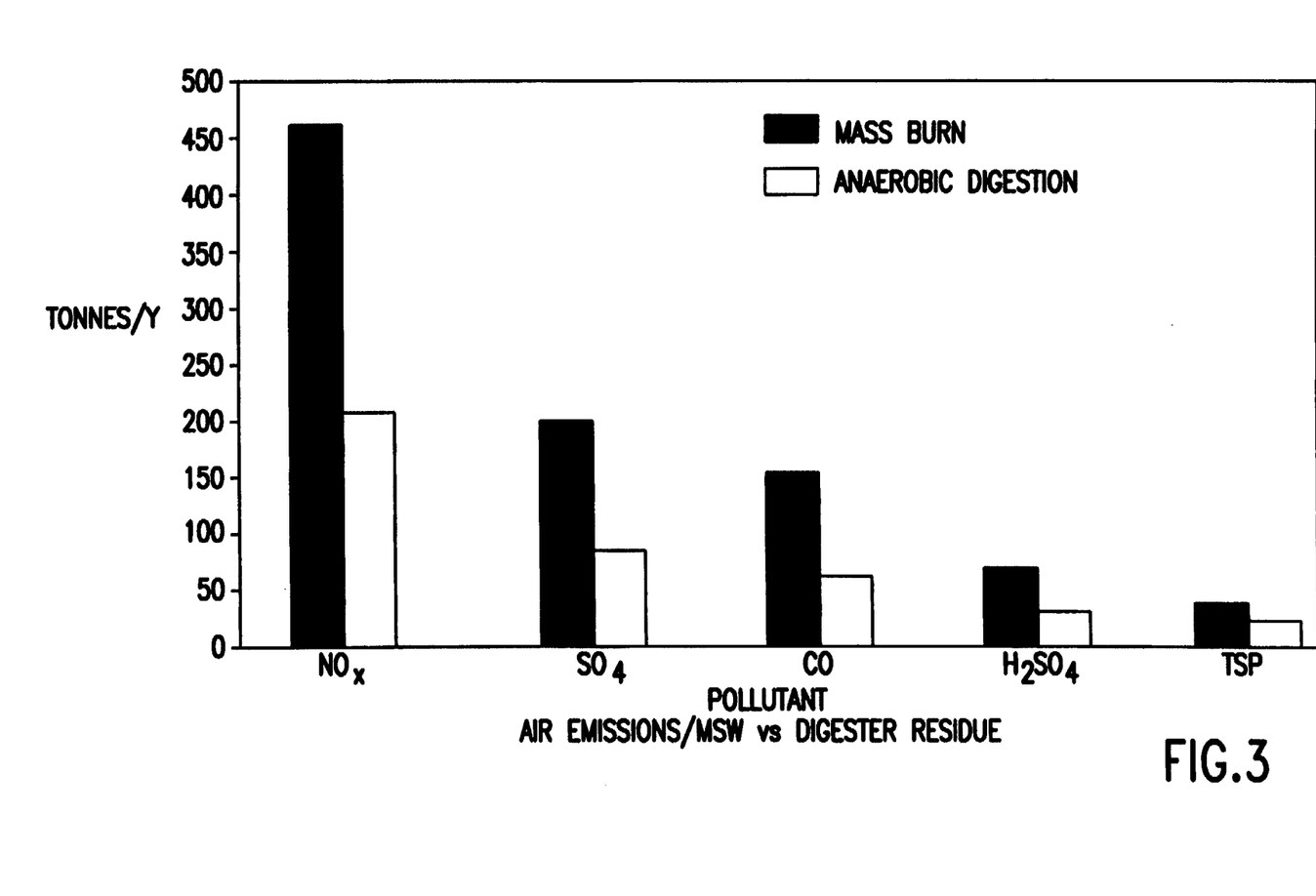
FIG. 3 is a graph showing Air Emissions/MSW vs. Digester Residue.
Figure 4:
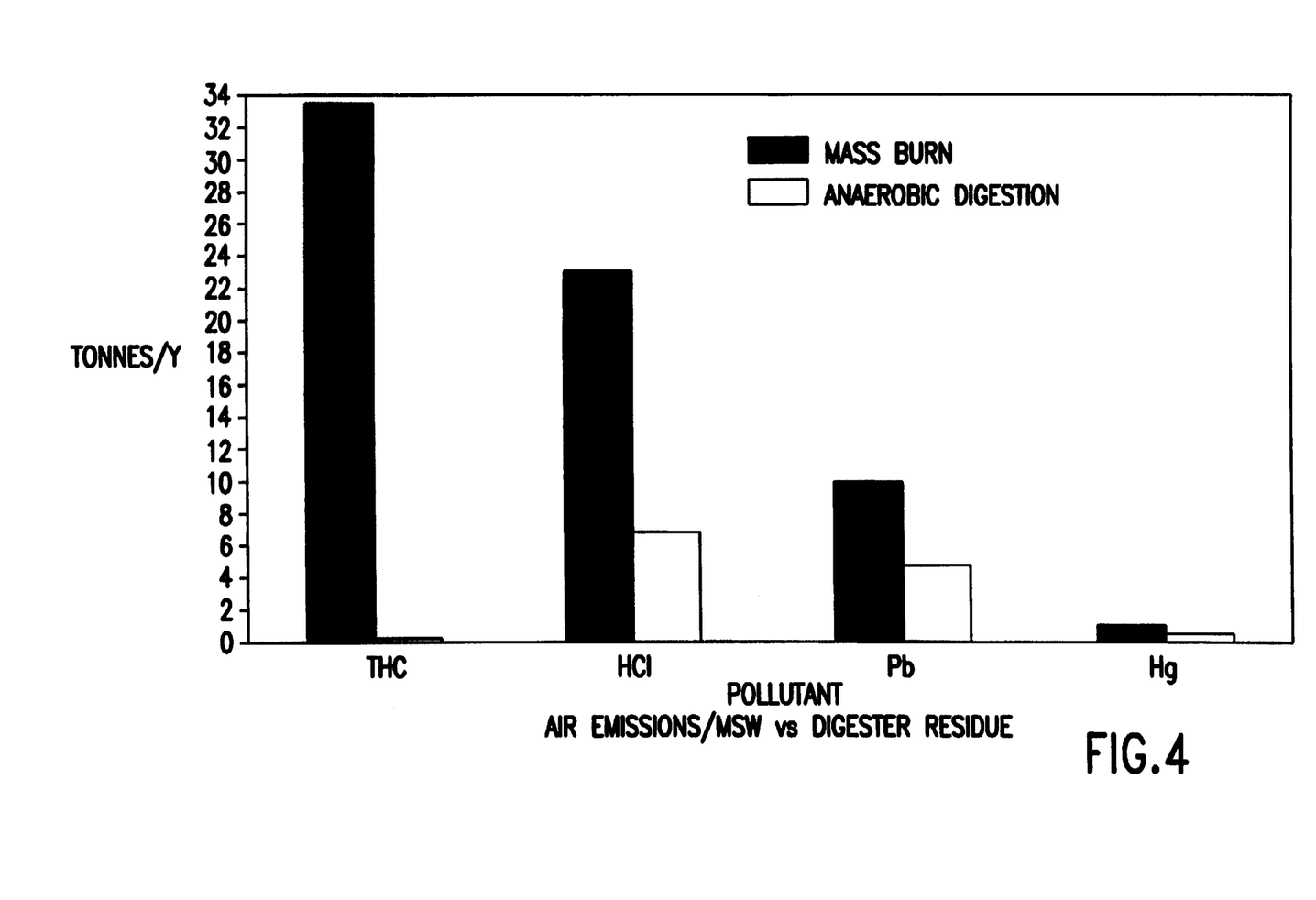
FIG. 4 is a graph showing Air Emissions/MSW vs. Digester Residue.

The lignin enriched residue also acts as a volatile binder when densified and is clean burning when compared to MSW. FIGS. 3 and 4 compare a 1000 ton per day (TPD) facility burning MSW (Mass Burn) vs. a comparable facility burning the residue from an anaerobic digestion process receiving RDF feed (Anaerobic Digestion). Clearly the residue when burned is environmentally superior when major air emission pollutants, nitrous oxide ($NO_x$) and sulfur dioxide ($SO_x$), are less than one-half that of a mass burn facility.

MSW/RDF typically requires a binder when densified into a solid fuel to maintain durability for efficient and economical handling, storage and transportation. Binders can also improve air quality emissions during combustion; however, they comprise 10-30% of the finished product, are not volatile and have no heating value which significantly reduces the overall heating value of the finished product. Being inert, they also add to the ash disposal problem. The lignin rich digester residue of this claim, on the other hand, makes a hard durable solid fuel with an enhanced heating value, avoiding binder addition and its allied problems. This is another superior feature unique to this claim.

As stated previously, digester residue can be used alone as a high energy solid fuel or it can be mixed with coal or other Btu enhancers to make an even higher Btu solid fuel. Residue at 50% solids mixed with coal fines on a 50/50 basis has the ideal moisture content (25%) for the densification process, such as pelletizing, briquetting, and the like. Energy is not expended in driving moisture off the residue prior to the process and the resultant solid fuel can be burned, at the appropriate mix, in coal burning power plants to meet air emission standards without costly stack retrofits.

The numerous midwestern power plants now burning high sulfur coal and that segment of the coal industry producing it can remain economically viable businesses. The utilization of the lignin rich residue from the anaerobic digestion of processed MSW to make a high quality recycled, high energy solid fuel which burns cleanly, reduces air emissions and maintains its integrity without a non-volatile binder are all unique to our invention and are not taught by known references.

The process taught by Dickson, U.S. Pat. No. 1,015,302, does not address the same feedstocks or AD process and is not applicable to our invention. The process taught by the Dickson '302 patent does not use a processed MSW or RDF high solids feedstock, therefore it cannot produce the same lignin enriched residue. It is an open process in which the anaerobic digestion of an organic feed to methane and carbon dioxide, which requires an oxygen free environment, cannot take place. European Patent 0 036 140 simply teaches another RDF process which uses coal to make a low-Btu solid fuel.

The Ruffo et al. '672 patent teaches a process which uses "compression" to separate "solid urban waste (SUW)". The Ruffo et al. '672 patent teaches use of ". . . a high-pressure press 5 which separates in a known manner the putrescible organic material or pulp 6 from the dry material 7 in the waste", at Col 3, lines 47–49, thereby, ". . . eliminating all or practically all of the putrescible organic part from the dry material . . . " Col 3 lines 54–55. At Col. 4, lines 1–3, the Ruffo et al. '672 patent defines the ". . . dry part, constituted by paper, plastics, fabric, glass, non-ferrous metals and other fine constituents which are expelled in the form of compacted blocks . . . ". The most that could be separated by the process taught by the Ruffo et al. '672 patent is putrescible foodwaste, comprising 7.4% of MSW which is then subjected to anaerobic digestion, from paper (40% MSW) and yardwaste (17.5% MSW) which are dry (5% moisture for paper) and are "compacted" for burning. Paper and yardwaste are the dominant components of MSW and provide the ligno-cellulosic feedstock from which a lignin rich residue is produced via anaerobic digestion as taught in this invention.

The Ruffo et al. '672 patent teaches removal of these major contributors of lignin upfront as well as plastics and textiles which contribute, albeit a small amount, to this claims residues superior high heating values and densification properties. However, the Ruffo et al. '672 patent clearly does not teach or suggest subjecting the same ligno-cellulosic feed to anaerobic digestion, as we do. Any residue or "humus" coming off the process according to the Ruffo et al. '672 patent would not have the same characteristics as the lignin enriched residue according to our invention. Therefore none of the teachings of the process according to the Ruffo et al. '672 patent are applicable to our invention.

In some conventional industrial combustion systems, Refuse Derived Fuel (RDF) is combusted either alone or with coal. In one such conventional combustion process, the RDF and coal are mixed with a non-volatile binder and formed into pellets. However, when mixed with coal, the RDF and the binder tends to lower the overall heat content of the combined fuel since the RDF typically has a heat content of approximately 4,500 to 8,000 Btu/lb dry matter and the binder is non-volatile. The RDF used according to this invention preferably is either fine processed RDF with ferrous and other non-combustible materials removed, having a heat content value of about 5,600 to 6,000 Btu/lb dry matter, or further processed RDF in which the solid material is densified into pellets or energy cubes, such RDF having a heat content value of about 6,000 to 8,000 Btu/lb dry matter.

Even with the combined RDF and coal fuel, power plants and other industrial facilities which combust the combined RDF and coal fuel require high-cost retrofit and equipment conversions for incorporating emissions control devices, such as scrubbers and bag houses. Such facilities are required to operate under the Best Available Control Technology (BACT) according to Environmental Protection Agency (EPA) standards. Such additional emissions control devices are necessary to reduce the undesirable emissions, including sulfur oxides ($SO_x$), particularly sulfur dioxide ($SO_2$), nitrogen oxides ($NO_x$) and total hydrocarbons (THC).

According to one preferred embodiment of this invention, the solid fuel contains only recycled residue from anaerobic fermentation of the organic material derived from primarily MSW. Throughout this specification and in the claims, the phrase "recycled residue" and the term "recycling" are intended to relate to recovering a resource, such as the residue of this invention. The residue can be recycled by making it into a useful fuel, in pellet or energy cube form, rather than disposing the residue in a waste landfill, for example. Also by recycling, the RDF is converted into methane, carbon dioxide and the residue. Recycled residue discharged from an anaerobic digester is in a slurry form comprising approximately 6% to 8% solids. For purposes of this invention, the slurry recycled residue is preferably dewatered to form a filtered cake comprising approximately 40% to 60% solids.

The organic material is preferably municipal solid waste, raw sewage sludge, biomass feedstock, industrial waste, agricultural waste, mixtures thereof, or any other suitable organic material known in the art. In another preferred embodiment according to this invention, the solid fuel further comprises a volatile solid fossil fuel, such as coal. However, it is apparent that peat, lignite and/or any other suitable volatile solid fossil fuel can be used. In a preferred embodiment according to this invention, the coal is either lignite, anthracite coal, meta-anthracite coal, bituminous, sub-bituminous coal or mixtures thereof. Lignite alone typically has a heat content of about 8,000 to 9,000 Btu/lb dry matter, anthracite coal alone about 12,500 to 13,000 Btu/lb dry matter, and high sulfur coal alone about 11,500 to 11,800 Btu/lb dry matter.

According to this invention, the combination of the recycled, high-volatile residue with a highly volatile solid fossil fuel, such as a highly volatile coal constituent, precludes the need for non-volatile binders and additional sorbents to react with the potential pollution-forming elements present in the coal fraction, during combustion. Although the recycled residue resulting from the anaerobic fermentation, which forms a cellular, coherent, solid material and a portion of residual plastic, is suitable as a binder of the residue itself or the combined residue and coal, other binders may still be used to satisfy industrial requirements. Undesirable emissions, such as $SO_x$, particularly $SO_2$, $NO_x$, and THC, are reduced by combustion of the clean recycled residue through dilution of the coal content and a synergism that causes significant reductions in the undesirable emissions. The recycled residue can be formulated with varying amounts and types of coal to act as a dilution agent and to combine with sulfur and nitrogen contained within the coal, as well as other potentially harmful emission causing coal components. The recycled residue can be formulated with such types of coal to meet specific customer requirements of heat content value, ash content, moisture content, ash fusion temperatures, ash by-product reuse and resultant flue gas composition.

The recycled residue of this invention can be dried with conventional bulk drying equipment. The bulk size of the dried residue can then be reduced with conventional grinding equipment, such as a hammermill with screen opening sizes that are adjustable for accommodating the desired size of the bulk product. Since the recycled residue acts as a binder, the residue or the combined residue and coal solid fuel can be formed into pellets or energy cubes. Such pellets are formed with conventional extrusion devices by extruding the residue or combined and bound residue and coal solid fuel through properly sized radial holes in a cylindrical die.

In a process according to one preferred embodiment of this invention, a combustible mixture is introduced into a combustion chamber and combusted within the combustion chamber. Combustion products are discharged from the combustion chamber. According to one preferred embodiment of this invention, combustion air is mixed with the recycled residue from the anaerobic fermentation of the organic material to form the combustible mixture. In another preferred embodiment according to this invention, the recycled residue can be mixed with the volatile solid fossil fuel, such as the coal constituent which preferably comprises lignite, anthracite coal, meta-anthracite coal, bituminous coal and/or sub-bituminous coal.

The solid fuel of this invention can be burned on a grate or in suspension burners at existing industrial facilities that burn coal, with minor or no modifications to existing equipment and processes. The solid fuel according to this invention can be formulated and physically sized to have characteristics similar to conventional solid fuels combusted at such existing facilities. The solid fuel according to this invention is competitively priced compared to conventional solid fuels, since there is an economic incentive to recycle a high percentage of municipal solid waste. The solid fuel of this invention also facilitates combustion of lower cost Midwestern high-sulfur content coals by combining such coals with the recycled residue to provide acceptable combustion chemistry without addition of non-volatile binders or sorbents. The solid fuel according to this invention can be formulated to provide continuous self-supporting combustion without the need for co-firing with other support fuels and/or binders. The solid fuel according to this invention can be formulated to create specific ash resistivity to enhance operation of existing electrostatic precipitation devices for particulate emission control.

The solid fuel according to this invention has a low moisture content which reduces combustion losses due to evaporation of moisture in the fuel. Also, the solid fuel according to this invention reduces problems associated with cooling flue gases and the resulting acidic condensation which occurs in the presence of the products of combustion of sulfur.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of this invention.

I claim:

1. A solid fuel comprising a recycled lignin-comprising residue from anaerobic digestion of a ligno-cellulosic organic material which produces said recycled lignin-comprising residue with a heat content value of approximately 8,500 to 10,500 Btu/lb dry matter, said ligno-cellulosic organic material being selected from the group consisting of municipal solid waste, raw sewage sludge, industrial waste, and mixtures thereof.

2. A solid fuel according to claim 1 wherein said recycled lignin-comprising residue is compressed into a form of a pellet.

3. A solid fuel according to claim 1 further comprising a volatile solid fossil fuel.

4. A solid fuel according to claim 3 wherein said solid fossil fuel comprises a coal constituent selected from the group consisting of lignite, anthracite coal, meta-anthracite coal, bituminous coal, sub-bituminous coal and mixtures thereof.

5. A solid fuel according to claim 3 wherein said volatile solid fossil fuel and said recycled lignin-comprising residue are bound together in a pellet form.

6. In a process for combustion in a combustion chamber wherein a combustible mixture is introduced into and combusted within the combustion chamber and combustion products are discharged from said combustion chamber, the improvement comprising: mixing combustion air with a recycled lignin-comprising residue from anaerobic digestion of a ligno-cellulosic organic material to form said combustible mixture wherein said recycled lignin-comprising residue has a heat content value of approximately 8,500 to 10,500 Btu/lb dry matter, said recycled lignin-comprising residue being derived from at least one of municipal solid waste, raw sewage sludge and industrial waste.

7. In a process according to claim 6 wherein said recycled lignin-comprising residue is introduced into said combustion chamber in a form of a pellet.

8. In a process according to claim 6 wherein a volatile solid fossil fuel is mixed with said combustion air and said recycled lignin-comprising residue to form said combustible mixture.

9. In a process according to claim 8 wherein said solid fossil fuel is a coal constituent comprising at least one of lignite, anthracite coal, meta-anthracite coal, bituminous coal and sub-bituminous coal.

10. In a process according to claim 8 wherein said recycled lignin-comprising residue and said solid fossil fuel are bound together and introduced into said combustion chamber in a form of a pellet.

* * * * *